Jan. 13, 1970  A. KIRKPATRICK  3,488,960
COMBINED COOLING TOWER AND INTERNAL STACK FOR
STEAM GENERATING POWER PLANTS
Filed April 12, 1968  5 Sheets-Sheet 2
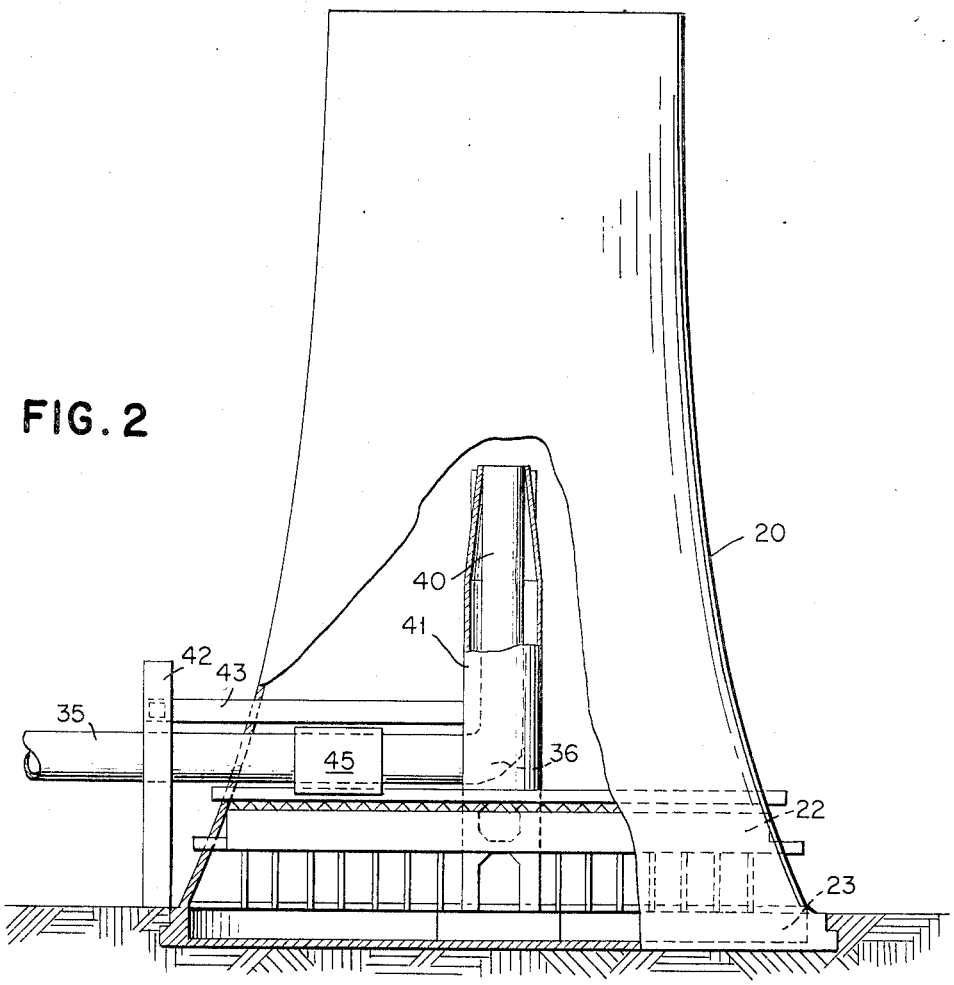
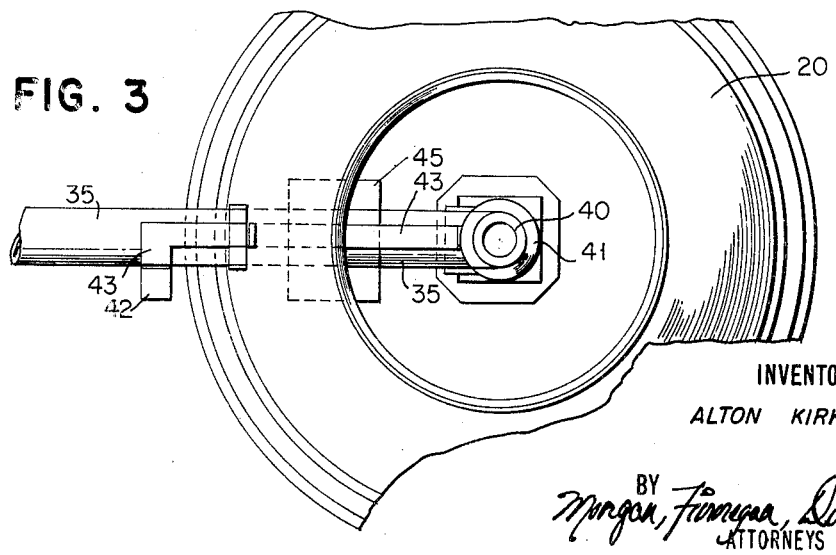
INVENTOR
ALTON KIRKPATRICK

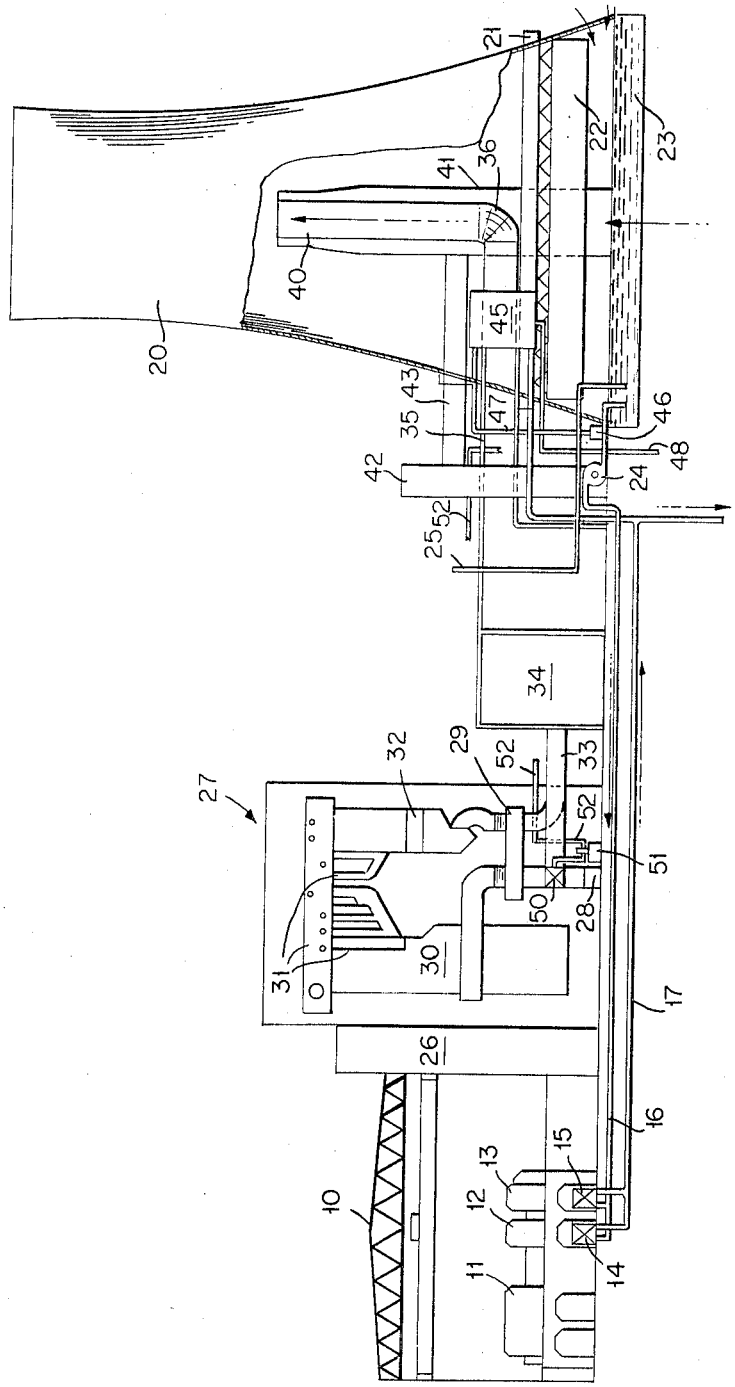

INVENTOR
ALTON KIRKPATRICK

United States Patent Office 3,488,960
Patented Jan. 13, 1970

3,488,960
COMBINED COOLING TOWER AND INTERNAL STACK FOR STEAM GENERATING POWER PLANTS
Alton Kirkpatrick, 232 Mystic St., Arlington, Mass. 02174
Filed Apr. 12, 1968, Ser. No. 720,846
Int. Cl. F01k 19/10; F01n 3/04
U.S. Cl. 60—95                    7 Claims

ABSTRACT OF THE DISCLOSURE

A steam-powered electric generating station is disclosed as an example in which the steam generator stack of the boiler for the disposal of the gases resulting from fossil fuel combustion is placed within the tall reinforced steam condenser cooling tower structure serving the steam condenser. In this manner, the cooling tower performs the dual function of cooling steam condenser circulating water as well as providing for the atmospheric disposal of the products of combustion. In addition, where the steam generating plant is powered by a nuclear reactor housed within a containment vessel, a venting arrangement is disclosed for venting the emergency release of fission products and gases from the reactor with the effluent of the combined cooling tower and internal stack.

Background and objects of the invention

This invention relates generally to large steam-electric generating stations for producing several hundred megawatts of power, and relates more particularly to a novel combined cooling tower and internal steam generator stack for use in such installations, the combined cooling tower and internal stack functioning to both cool the condenser circulating water and provide for the atmospheric disposal of both condenser heat and the products of combustion from the steam generating unit.

There are various limiting factors as to distribution and size of steam-electric power projects utilizing fossil fuel as the source of energy. The two principal limiting factors are the diffusion of the stack gases into the atmosphere and the rise in temperature of the water in a natural water supply, such as a river, lake or reservoir, due to the discharge of heated condenser circulating water directly therein.

At certain sites, the second limiting factor mentioned above may be obviated by recirculating the condenser water to a heat exchanger in the form of a large, natural draft cooling tower wherein the transfer of heat is accomplished mainly by evaporation and, in some measure, by sensible heat transfer. These cooling towers, generally made of concrete, have a wide circular base and a wall tapering into a narrower, flared top. The design follows the curvature of a hyperbola, hence the towers are generally referred to as "hyperbolic cooling towers." In large installations for electric power plants, the height of such towers may reach to about 300–400 feet.

However, at the present time, the commercial feasibility of the natural draft cooling tower is not suited to certain climatological conditions, such as low relative humidities and high wet bulb temperatures. However, in natural draft cooling towers of the low rectangular type that have been in general use in America where cooling towers are used, there is often air and vapor discharge from the tower at a low level, such that it becomes recirculated through the cooling tower and also tends to foul switchyard electrical equipment.

In addition to the use of either a cooling tower or a natural water supply as a heat exchanger wherein condenser heat is dissipated, steam-electric generating installations must necessarily have means for disposing of the combustion by-products, in the case of a fossil-fuel installation, or for releasing radioactive or toxic gases from a containment vessel, in the case of certain types of nuclear reactor powered installations. In either case, this is accomplished by chimneys or stacks which dissipate these products into the atmosphere. In large fossil fuel fired installations such structures must be extremely high in order to reduce the ground level concentration of the gases and particulate matter thereof which would cause a large amount of air pollution. In fossil fuel installations, smoke stacks on the order of 600 to 800 feet in height are generally necessary to insure a plume rise that will be safe from contamination of air at ground level.

The conventional high stacks are subject to numerous disadvantages. They are expensive to build and maintain and constitute an aviation hazard. Also in order to obtain a high plume above the stack exit, high emission velocity and, hence, high gas pressure is required. However, under high gas pressure considerable difficulty is experienced due to the formation of acid condensation within the stack, especially during cold weather, which penetrates a masonry stack lining, or requires a steel lining which is quite costly in a tall stack.

The combined cooling tower and internal stack of the present invention eliminates all of the foregoing disadvantages where a separate stack and cooling tower are utilized, and has several additional advantages, including: (1) substantially reducing the ground level concentrations of combustion pollutants, since the height of the plume is substantially greater, and the effluent volume is 20–25 times greater, than that for a conventional fossil fuel stack; (2) permitting the relief of an increase in the pressure within a containment vessel for a nuclear power reactor caused by the emergency release of steam and fission products therein, by venting the fission products and gases through the cooling tower effluent with minimal adverse effects on surrounding life and property; (3) resulting in a doubling of the allowable maximum plant capacity of conventional steam-electric power stations at any given site; and (4) resulting in at least a 15 percent increase in the admission of cooling air to the tower during periods of warm ambient temperatures, further resulting in increased cooling, improved condenser vacuum and a corresponding fuel saving.

It is therefore an object of this invention to eliminate the disadvantages of separate cooling towers and boiler stacks in conventional steam-electric power generating stations, and improve the economic feasibilty of large power projects.

It is a further object of the invention to reduce the air pollution hazards and contamination of the atmosphere in fossil fuel and nuclear powered steam-electric installations.

Another object of the invention is to reduce the cost of the installation of steam-electric generating plants by a novel design for the disposal of some of the waste products concomitant with the operation of such plants.

Another object of the invention is to simplify the construction of steam-electric power generating plants by reducing the size of those component elements which perform the function of atmospheric disposal of the by-products of combustion.

A further object of the invention is to reduce the quantity of particulate matter in the gaseous by-products of combustion which is concentrated at ground level at given distances from the power station stack.

A still further object of the invention is to increase the height of the rise of the gaseous contaminate in the atmosphere and thus reduced air pollution at ground level.

Objects and advantages of the invention are set forth in part herein and in part will be obvious herefrom, or may be learned by practice with the invention, the same being realized and attained by means of the instrumentalities, steps, processes and combinations pointed out in the appended claims.

The invention consists in the novel parts, constructions, arrangements, steps, processes, combinations and improvements herein shown and described.

Summary of the invention

Briefly described, the present invention utilizes a tall reinforced cooling tower for the dual purpose of cooling the condenser circulating water in a steam-electric generating plant by atmospheric disposal of the condenser heat and, at the same time, serves as a disposal unit for the products of combustion from the steam generating unit.

By this novel concept, in a fossil fuel installation the conventional smoke stack of inordinate size is completely eliminated and combustion gases are introduced into the cooling tower where, by means of a relatively small stack, they are dissipated in the effluent of the tower to be released in the atmosphere. Thus, the cooling tower also becomes the boiler stack of the steam generating plant.

In a nuclear reactor powered steam-electric generating plant in which the reactor is housed within a containment vessel, the combined cooling tower and internal stack may also be advantageously utilized for relieving an increase in the pressure within the containment vessel caused by the emergency release of steam and fission products therein, by venting the fission products and gases through the cooling tower effluent.

In a preferred embodiment of the invention, there is provided a forced draft fan bypass which operates when the steam generator gas velocity is reduced below a predetermined level to supply additional air to the stack so as to maintain a constant exit velocity from the cooling tower, thereby avoiding contamination of the condenser circulating water during start-up and light load conditions.

It will be understood that the foregoing general description and the following detailed descripiton as well are exemplary and explanatory of the invention but are not restrictive thereof.

The accompanying drawings, referred to herein and constituting a part hereof, illustrate one embodiment of the invention, and together with the description, serve to explain the principles of the invention.

Brief description of the drawings

Of the drawings:

FIGURE 1 is a schematic view, partly in elevation, illustrating the general layout of a steam-electric generating station embodying the combined cooling tower and internal stack of the invention;

FIGURE 2 is a view in side elevation, partly in section, of the combined cooling tower and internal stack shown in FIGURE 1, illustrating the arrangement of the infeed of the stack gases, a scrubber, and the placement of the stack within the cooling tower;

FIGURE 3 is a fragmentary view in top plan of the structure shown in FIGURE 2, the view partially cut away to illustrate the centralized location of the boiler stack within the tower;

Description of the preferred embodiment

Figure 4:
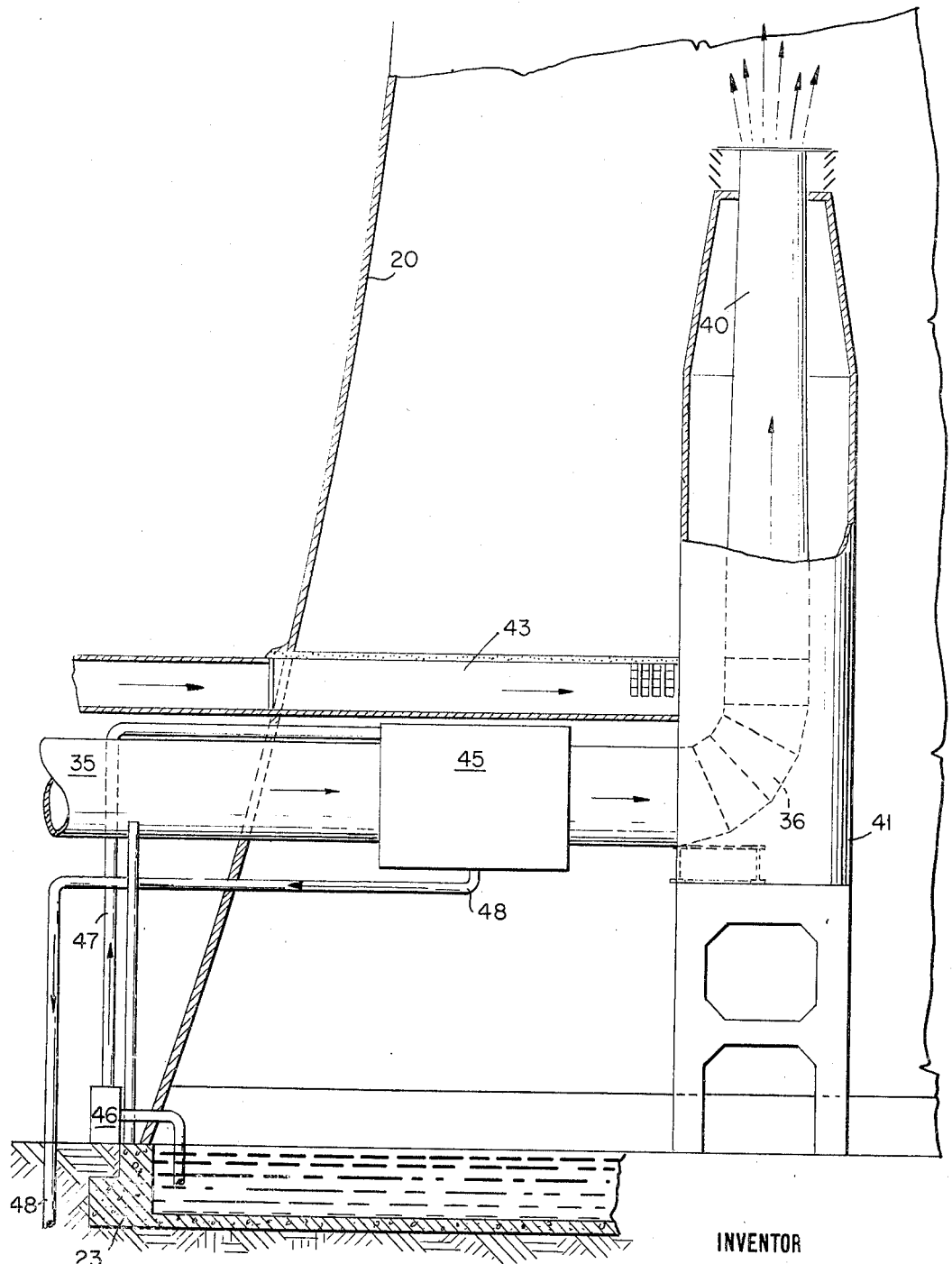
FIGURE 4 is an enlarged fragmentary view in side elevation, partly in section and partly diagrammatic, illustrating the construction of FIGURES 1 and 2 in greater detail.

Referring now more particularly to the embodiment of the invention shown in the accompanying drawings, there is illustrated in FIGURE 1 the general layout of a fossil-fueled steam-electric power station, shown in schematic form to illustrate an installation where there is a steam-producing plant and a cooling for cooling the condenser recirculating water.

It will be understood that, since the invention resides in the portion of the installation which deals with the disposal of by-products of combination and the use of the cooling tower in connection therewith, no detailed references need be made to the other component elements which make up a conventional steam-electric generating plant. However, for the overall understanding of the invention, it is noted that there is depicted a building 10 which houses the electric generator 11, steam turbine 12 and 13 and the condenser 14 and 15. The piping 16 and 17 serves to forward the condenser water to the cooling tower 20, and back into the condensers.

The condenser water is advantageously cooled by the cooling tower in the conventional manner, as by entering an elevated water ring 21 from which it is sprayed onto a suitable heat exchanger assembly (commonly termed "fill") 22, and cooled by the natural draft of ambient air entering the inlet in the base of the cooling tower (not shown) as it passes through the "fill" into a reservoir 23 in the bottom of the cooling tower. The cooled condenser water is then recirculated back to the condensers by suitable means, such as circulating pump 24. A suitable reserve water supply for cooling tower water make-up is shown at 25.

In addition, there is schematically depicted in FIGURE 1 a fuel processing and handling facility 26, which would include, e.g., a coal conveyor and pulverizer, and the steam generating unit, indicated generally by reference numeral 27. The steam generator unit conventionally, and as here preferably embodied, includes two or more forced draft fans, one of which is shown at 28, air pre-heater 29, combustion furnace and boiler 30, which produce and store the steam, super-heater and reheater 31, and economizer 32. The gaseous by-products of combustion are then directed through the flue outlet 33 and, advantageously, into and through a conventional electrostatic or mechanical precipitator 34, which is capable of removing on the order of 95% of the dust particles contained in the flue gases.

In accordance with the invention, the products of combustion from the steam generating unit which are contained in the flue gases are passed into stack means within the cooling tower and dissipated in the effluent of the cooling tower.

To this end, the flue gases leaving the precipitator 34 pass through a suitable flue stack conduit 35 and into the cooling tower 20. The conduit 35 has an elbow at 36 and extends upwardly therefrom, terminating below the perimeter of the cooling tower 20 in a relatively short stack 40. As best seen in FIGURES 2–4, flue conduit 35 enters the cooling tower 20 near its base and, at the center line thereof, due to the elbow 36, makes a 90 degree turn so as to extend upwardly and terminate in the stack 40. Advantageously, stack 40 has a stainless steel interior surface and is enclosed by a control ventilated tower 41, suitably formed of reinforced concrete or masonry and of sufficient diameter to allow inspection of the stack and isolate it from the cooling tower circulating water. Also, there is advantageously provided an elevator shaft 42 and a walkway 43 to provide access to the stack 40 for inspection, instrumentation, etc. Walkway 43 may suitably form a spiral around the stack 40, although not shown in the drawings in order to simplify the illustration.

A suitable scrubber 45, illustrated in schematic form only, may advantageously be included in the flue stack conduit 35, and may conventionally utilize a water spray cascading therethrough for the removal of fly ash and other particulate matter. Advantageously, the water for the scrubber is pumped by a suitable pump, indicated at 46, from the cooling tower water reservoir 23 (FIGURE 4) through conduit 47 to the top of the scrubber, is collected in a catch basin below the scrubber, and discharged to waste as cooling tower blow-off through conduit 48. However, in the preferred embodiment of the invention, the scrubber is eliminated since the increased volume and height of the effluent in which the flue gases are dissipated, more fully described hereinbelow, provides adequate pollution control and removes the necessity for handling and disposing of fly ash and other pollutants in the scrubber wash water. In any case chemical control equipment will indicate the amount of blowdown required and level control equipment on makeup water will maintain reservoir level.

In accordance with the invention, and as here preferably embodied, forced draft fan means and by-pass conduit means are provided, the latter serving to supply additional air directly to the stack flue conduit when the flue gas exit velocity reaches below a predetermined level, to thereby maintain the effluent of the internal stack at a constant velocity so as to insure that contamination of condenser circulation water within the tower will not occur.

To this end, as illustrated schematically in FIGURE 1, there is provided a by-pass conduit 50 leading directly from each of the forced draft fans 28 to the flue outlet 33. The pressure in the by-pass conduit is controlled by pressure regulator valves 51 which operate suitable dampers so as to admit pressurized forced draft fan air to the flue gas conduit when the boiler flue gas supply exiting to the conduit is insufficient. The pressure in the flue gas conduit is advantageously sensed and a suitable electrical signal transmitted to the by-pass valve controllers 51 by means of a sensor pipe 52 from a suitable connection in the flue gas conduit at the cooling tower. Advantageously, as here preferably embodied, the by-pass valve control mechanism is conventional such, for example, as that manufactured by the Bailey Meter Company of Cleveland, Ohio.

Assuming an exemplary fossil fuel steam-electric power station, it will be apparent from the foregoing that the operation of the forced draft fans is as follows. With the plant operating at its rated full load capacity, the normal pressure in the flue gas conduit is assumed to be 1.0 inch of water column and the stack exit velocity is 5,000 f.p.m., the latter assuring the discharge of all stack contaminants from the cooling tower. Under these conditions, the forced draft by-pass valves are closed. Thereafter, assuming that an operating change occurs, decreasing the quantity of the flue gas, and the velocity pressure in the conduit is reduced to a predetermined lower limit of, for example, 0.9 inch of water column, the stack exit velocity is insufficient to insure complete discharge of the flue contaminants and sensor pipe 52 transmits a signal to controllers 51, and the latter open the by-pass valves to admit forced draft air from fans 28. Upon again reaching the 1.0 inch water column pressure, sensor pipe 52 transmits a further signal to controllers 51 to close the by-pass valves, and the cycle is repeated as necessary. Practical engineering considerations within the skill of the art will determine the outer limits of the pressure range which will actuate sensor pipe 52, in order that the by-pass valves are not being constantly operated to open and closed positions.

Figure 5:
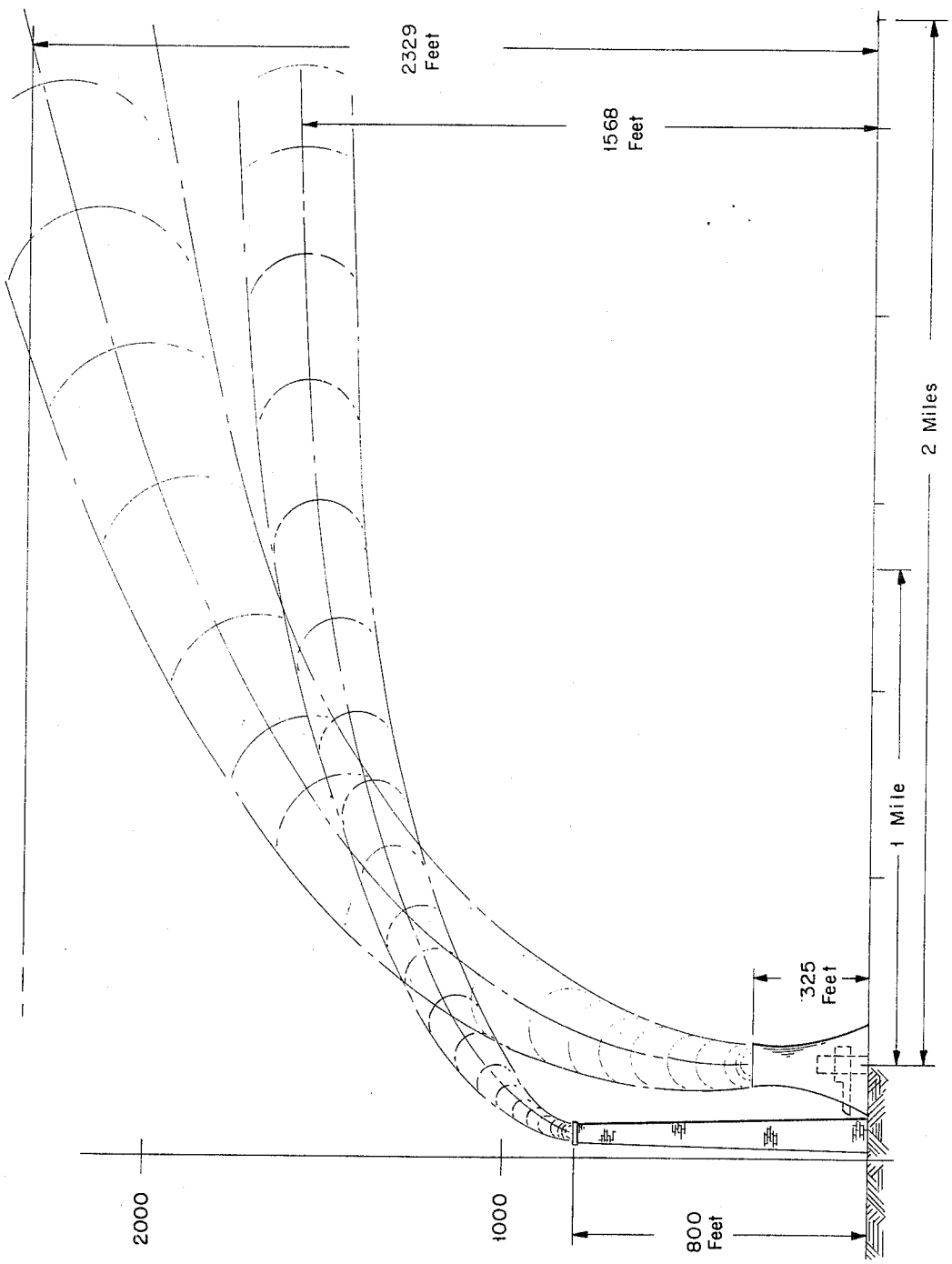
FIGURE 5 is a graphical comparison of the height of the plume rise from a conventional tall stack structure and that from a combined cooling tower and internal stack embodying the invention.

Referring to FIGURE 5 of the accompanying drawings, the graph shown is based on conditions of wind velocity of 13.2 miles per hour, an ambient dry bulb temperature of 80° F., and an ambient temperature gradient of 0.001° C./ft., and illustrates the higher efficiency of the combined cooling tower-boiler stack with respect to plume rise and disposal of the stack gases in the atmosphere. Thus, the graph shows that in a conventional power plant chimney having a height of 800 feet, the plume rise reaches a height of 1,568 feet at 1¾ miles. With the cooling tower-internal stack combination, the plume rise is calculated to reach 2,329 feet at 1¾ miles, assuring a markedly greater reduction in the ground level concentration of air pollutants.

It has been found that the combined cooling tower and internal stack structure of the invention has other equally significant advantages over the conventional use of separate stacks and cooling towers, some of which have been previously mentioned. In addition, computations based on accepted calculating techniques show (1) the combined cooling tower-internal stack of the invention produces more natural draft due to increased gas temperature within the upper part thereof and thus induces an increased air flow through the cooling tower, such that during the warmer weather, the air entering the tower is estimated to increase at least 15% for the cooling tower-stack combination, resulting in at least a 3° F. reduction in re-cooled water temperature, which is a reduction of 3 degrees in approach to the ambient wet bulb; (2) with the equivalent of 2.3 sulfur coal passing through the stack as sulfur dioxide ($SO_2$), the effluent of a combined cooling tower-internal stack contains 132 parts per million (p.p.m.) of $SO_2$ as compared to 3700 p.p.m. $SO_2$ contained in the effluent of the stack when it is separate from the cooling tower; also, the effluent of the combined cooling tower-internal stack contains dust at only 13 p.p.m., as compared to 600 p.p.m. with a separate stack emission; (3) dust concentration at ground level, less than 1 mile downwind from the installation, with a combined cooling tower-internal stack is only 17% of the dust concentration occurring with a separate stack 800 feet in height; and (4) the concentration of sulfur dioxide ($SO_2$) at ground level, about 2 miles downwind from the installation, with a combined cooling tower-internal stack is only ⅓ of that occurring with a separate stack 800 feet in height.

While the benefits of the combined cooling tower and internal stack structure of the invention are directed chiefly to fossil fuel as a source of energy and the disposal of the stack gases from the combustion thereof, this combination also has a novel and important utility as a safety measure in the dissipation of containment gaseous by-products in a nuclear reactor in case of a nuclear incident.

Thus, also in accordance with the invention, means are provided for interconnecting a conventional nuclear reactor containment vessel with the stack flue conduit such that, upon the containment vessel attaining a pressure exceeding that which can be safely maintained, the gases contained therein enter the stack flue conduit and are vented in the effluent of the cooling tower in a manner similar to that described in connection with the venting of stack gases of a fossil fuel fired steam generator.

Figure 6:
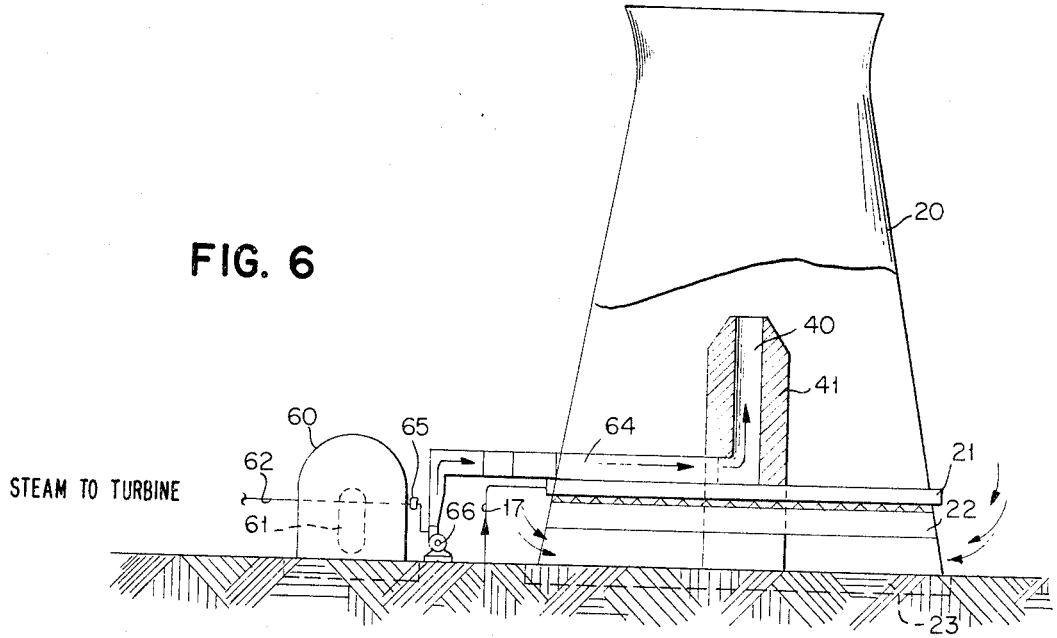
FIGURE 6 is a fragmentary schematic view, partly in elevation, illustrating the combined cooling tower-internal stack of FIGURE 1 embodied in a nuclear-powered, steam-electric generating station.
Figure 7:
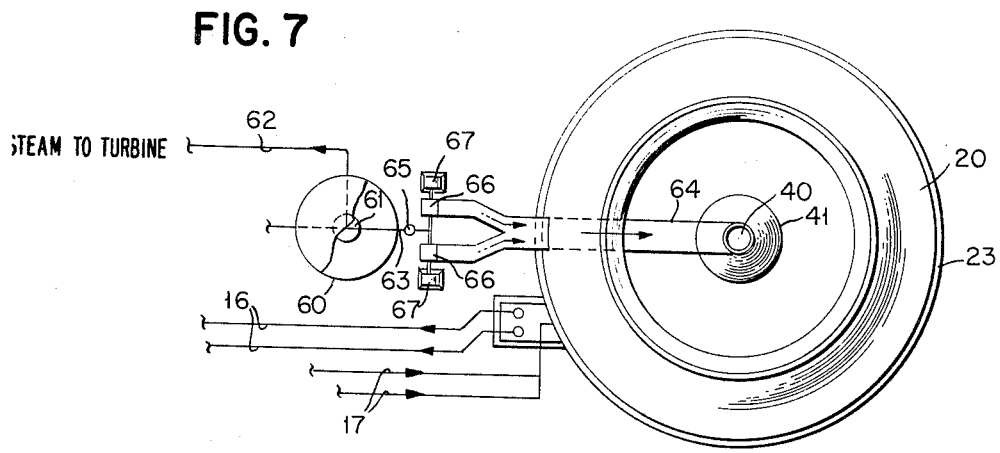
FIGURE 7 is a fragmentary view in top plan, partly schematic, of the structure shown in FIGURE 6.

To this end, referring particularly to FIGURES 6 and 7 of the accompanying drawings, there is shown a conventional containment vessel 60 suitably housing therein a nuclear reactor core 61, together with suitable associated coolant equipment (not shown), and from which extends the main steam outlet conduit 62 for supplying steam to a turbine generator or the like. Containment vessel 60 is interconnected with the internal stack 40 of cooling tower 20 by means of vent 63 and flue conduit 64. Advantageously, a rupture valve 65 is interposed in vent 63, whereby only upon a pressure exceeding that beyond the design limits of vessel 60 are gases permitted to enter the stack 40 via flue 64.

Advantageously, as here preferably embodied, upon a pressure increase occurring in vessel 60 and the consequent venting of gases to the cooling tower, a forced draft is admitted to flue 64, whereby a stack exit velocity of a predetermined quantity is produced so as to be capable of largely dissipating any radioactive gases contained in the effluent within the atmosphere. To this end, there is provided a pair of suitable fans 65, driven by suitable motors 67, advantageously delivering a forced draft velocity of 5000 f.p.m. Alternatively fans 65 may be operated continuously at low capacity serving as containment ventilating fans and, upon emergency venting, are actuated to full capacity.

The invention in its broader aspects is not limited to the specific embodiment herein shown and described but departures may be made therefrom within the scope of the accompanying claims, without departing from the principles of the invention and without sacrificing its chief advantages.

What is claimed is:

1. In a power plant system including a nuclear power reactor and associated steam-producing means, a containment vessel housing said nuclear power reactor for retaining emergency release of fission products and gases from said reactor, and a combined, direct contact, air-to-water cooling tower and internal stack for cooling the condenser circulating water of said steam-producing means and disposing of gaseous by-products, respectively, the method of relieving an emergency pressure increase in said containment vessel due to the release of said fission products and gases, comprising the steps of: venting said fission products and gases accumulated in said containment vessel into said combined cooling tower and internal stack, and diffusing said fission products and gases in the moist air effluent of said cooling tower.

2. In combination, a nuclear power reactor and associated steam-producing means; a containment vessel housing said nuclear power reactor for retaining emergency release of fission products and gases from said reactor; a steam-electric power generating system including water cooled steam condensing equipment; a combined direct contact, air-to-water cooling tower and internal stack for cooling the condenser circulating water of said power generating means and disposing of emergency release of fission products and gases, respectively; conduit means interconnecting said containment vessel with said cooling tower for venting said fission products and gases from said containment vessel into said tower; and means admitting a forced air draft to said conduit means at a velocity sufficient to discharge and diffuse said fission products and gases in the moist air effluent of said cooling tower.

3. The combination as claimed in claim 2, including forced draft fan means communicating with said conduit means, and means actuating said fan means upon emergency release of said fission products and gases to said conduit means for maintaining the stack exit velocity at a predetermined minimum value.

4. A system for the generation of steam for power purposes comprising,
   a fossil fuel fired steam generating unit including forced draft fan means admitting pressurized air to said steam generating unit for combustion of fuel;
   a direct contact, air-to-water, draft cooling tower for the atmospheric heat exchange of air and water containing the heat of condensed steam; and
   means for the atmospheric disposal of the products of combustion from said steam generating unit, said means comprising,
   a main conduit for directing the flue gas from said steam generating unit and said products of combustion contained therein into the upper portion of said cooling tower,
   said main conduit terminating in stack means within said cooling tower for dissipating said combustion products into the moist air effluent of said tower,
   by-pass conduit means adapted to communicate said forced draft fan means for said steam generating unit directly with said main conduit and stack means of said cooling tower, and
   sensor means located in said main conduit communicating said forced draft fan means directly therewith through said by-pass conduit means when the flue gas exit velocity in said main conduit is less than a predetermined minimum level, whereby the effluent of said stack means is maintained at a constant predetermined velocity.

5. The combination as claimed in claim 4, wherein said stack means is located within the confines of said cooling tower.

6. The combination as claimed in claim 5, wherein said stack means is located substantially coaxially of said cooling tower and extends upwardly therewithin, terminating below the upper perimeter of said tower.

7. A method of reducing both air and water pollution caused by the operation of a fossil fuel fired steam generating plant, comprising the steps of:
   recirculating the steam condenser water to a direct contact, air-to-water, cooling tower;
   introducing the flue gases from said steam generating plant and the products of combustion contained therein into said cooling tower in the direction of the moist air effluent therefrom;
   maintaining the velocity at which said flue gases and combustion products are introduced into said cooling tower at a rate sufficient to prevent any of said combustion products from being deposited in the circulating condenser water within the cooling tower, and
   diffusing said flue gases and combustion products in the cooling tower moist air effluent.

References Cited

UNITED STATES PATENTS

| | | | |
|---|---|---|---|
| 3,150,267 | 9/1964 | Caldwell | 290—2 |
| 3,296,450 | 1/1967 | Johnson | 290—2 |

FOREIGN PATENTS 525,702  9/1940  Great Britain.

MARTIN P. SCHWADRON, Primary Examiner

ROBERT R. BUNEVICH, Assistant Examiner

U.S. Cl. X.R.

60—106; 261—17; 290—2

PO-1050
(5/69)

UNITED STATES PATENT OFFICE
CERTIFICATE OF CORRECTION

Patent No. 3,488,960      Dated January 13, 1970

Inventor(s) Alton Kirkpatrick

It is certified that error appears in the above-identified patent and that said Letters Patent are hereby corrected as shown below:

Column 4, line 13, "cooling for cooling" should read --cooling tower for cooling--; line 17, "of combination" should read --combustion--.

SIGNED AND
SEALED

JUN 23 1970

(SEAL)
Attest:

Edward M. Fletcher, Jr.
Attesting Officer

WILLIAM E. SCHUYLER, JR.
Commissioner of Patents